Patented Feb. 17, 1953

2,628,989

UNITED STATES PATENT OFFICE 2,628,989

MANUFACTURE OF FLUOROOLEFINS

Charles B. Miller, Lynbrook, N. Y., assignor to Allied Chemical & Dye Corporation, New York, N. Y., a corporation of New York No Drawing. Application November 26, 1951, Serial No. 258,291

13 Claims. (Cl. 260—653)

This invention is directed to manufacture of fluoroolefinic compounds suitable for use chiefly as monomers.

A principal object of the invention lies in the provision of methods for making fluoroolefinic compounds from halofluoroalkanes by thermocatalytic procedures which may be easily controlled and carried out at moderate temperatures.

The starting materials utilized in practice of the invention comprise halofluoroalkanes containing at least two carbon atoms and containing at least one hydrogen atom and at least one halogen (e. g. chlorine) atom other than fluorine on adjacent carbon atoms. Such starting materials include, in the better embodiments of the invention, chlorofluoroethanes containing at least one hydrogen atom on one carbon atom and at least one chlorine atom on the other carbon atom. Representative compounds of this nature comprise $CH_2ClCHF_2$, $CHCl_2CHF_2$, $CCl_3CHF_2$, and other compounds subsequently noted. The invention particularly comprehends use as starting materials of chlorofluoroethanaes containing at least one hydrogen atom and at least one chlorine atom on adjacent carbon atoms, and at least one chlorine atom and one fluorine atom on a single carbon atom, illustrative examples of this type of compound including $CH_3CHClF$, $CH_2ClCHClF$, $CH_2FCHClF$, $CH_2FCCl_2F$ $CHClFCHClF$, $CHClFCCl_2F$ and $CCl_2FCHF_2$. The preferred starting materials are chlorofluoroethanes which contain a —$CClF_2$ group and at least one hydrogen atom on the adjacent carbon atom, e. g. $CH_3CClF_2$, $CH_2ClCClF_2$, $CHClFCClF_2$ and $CHCl_2CClF_2$. Although applicable to the utilization of a relatively large number of halofluoroalkanes as starting materials, for convenience the principles of the invention may be exemplified chiefly by reference to the manufacture of vinylidene fluoride, $CH_2=CF_2$ from 1,1,1-chlorodifluoroethane, $CH_3CClF_2$.

In accordance with the invention it has been found that the objects thereof may be effected by dehydrohalogenating the starting material to form reaction products comprising principally the sought-for fluoroolefinic compound and hydrogen halide. Thus, in the case of use of 1,1,1-chlorodifluoroethane as starting material, the reaction may be illustrated by $$CH_3CClF_2 \rightarrow CH_2=CF_2 + HCl$$

Additionally, when the initial material is $CH_2ClCCl_2F_2$, $CH_2ClCClF_2 \rightarrow CHCl=CF_2+HCl$ appears to take place, and when $CHCl_2CClF_2$ is used  as starting material dichloro vinylidene fluoride, $CCl_2=CF_2$, and HCl are formed. In all these instances, it will be noted that the olefinic compound corresponding with the chlorofluoroethane starting material is produced.

The invention comprises principally the discovery of certain catalysis and temperature conditions which make it possible to dehydrohalogenate the starting material in such a way as to obtain good conversion and at the same time avoid use of markedly high reaction temperatures. In general, procedural steps of the invention comprise passing the starting material through a suitable reactor while maintaining therein certain catalysis-temperature-reaction conditions, discharging the reaction products from the reactor, scrubbing the product gases e. g. with water to remove hydrogen halide, drying and condensing the gases, and then fractionating the condensate to obtain the desired products.

Practice of one of the more desirable embodiments of the invention involves adherence to three principal reaction conditions which have been found to conjunctively accomplish the dehydrohalogenation objective above noted. The first of these conditions comprises the carrying out of the reaction in the presence of carbon tetrachloride, $CCl_4$, it having been found that the presence of this material in the reaction zone brings about such a change in reaction conditions that the dehydrohalogenating procedure may be carried out at unexpectedly low temperatures. The function and mechanics of operation of $CCl_4$ are not clearly understood. Practice shows some relatively small loss of $CCl_4$, but on the other hand the substantial absence of $CCl_4$ decomposition products in the reactor exit gas is strong evidence to the effect that $CCl_4$ losses are probably mechanical, and that the action of the $CCl_4$ closely approaches that of a true catalyst. Whatever the exact chemical functions of the $CCl_4$ may be, practice shows that the overall action of $CCl_4$, from a practical viewpoint, may be considered to be that of a catalyst.

The second important operational feature, which applies to all embodiments of the invention, is temperature. It has been found that in order to obtain dehydrohalogenation and production of the sought-for fluoroolefinic compounds, in addition to maintenance of presence of $CCl_4$ in the reaction zone, temperatures should be held in the range of about 500–610° C. No worthwhile reaction appears to take place at a temperature appreciably below 500° C., and on the other hand no significant operating advantages are obtained at temperatures above about 610° C. The third important factor upon which successful practice of all embodiments depends is the maintenance in the reaction zone of the substantial absence of extraneously introduced elemental chlorine as such. The presence of even a very small amount of extraneously introduced chlorine into the reaction zone upsets the reaction conditions markedly, deteriorizes formation of olefinic compounds and gives rise to chlorinolysis and resultant formation of e. g. saturated one carbon atom products which are unwanted materials in the present process.

The quantity of carbon tetrachloride utilized in practice of the invention process may vary over a relatively wide range. Any small amount of $CCl_4$ which significantly catalyzes the reaction and effects formation of any appreciably greater quantity of sought-for product, than would be obtained in the absence of the $CCl_4$, may be utilized. Development work indicates that for general practice purposes $CCl_4$, in amount in the range of 2–25% by weight based on the weight of the incoming halofluoroalkane, at the reaction temperatures stated brings about good conversions of starting material to sought-for product. On the other hand, quantities of $CCl_4$ up to about 200% of the weight of the starting material have been utilized and notably good conversions obtained. Hence, quantities of $CCl_4$ may vary, according to particular reaction conditions and starting materials at hand, from less than say 0.5% by weight to as much as 200% by weight, indications being that quantities of $CCl_4$ in excess of the latter value do not effect any important improvements regarding conversion. It furthermore appears that within the generally preferred 2–25% $CCl_4$ quantity range there does not exist a particular more restricted $CCl_4$ quantity range which promotes best conversions with respect to the entire class of starting materials to which practice of the invention is applicable. Best results for any particular starting material appear to depend upon optimum $CCl_4$ quantity, temperature and space velocity conditions for such starting material. Space velocity per hour (volumes of reactant gas at room temperature per volume of reaction chamber per hour) while apparently not a wholly controlling factor may lie in the range of 100–700. In general, if a moderate amount of $CCl_4$ is employed, low space velocities and temperatures in the lower part of the 500–610° C. range are adequate. In the case of some starting materials, e. g. $CH_3CClF_2$ and $CH_2ClCClF_2$, conversion increases sharply with a very small temperature rise when temperatures are in the upper portion of the temperature range. In these instances higher space velocity may be employed. While the above indicated overall conditions with regard to $CCl_4$ quantity, temperature and absence of extraneously introduced elemental chlorine apply to all of the starting materials herein indicated, on the other hand most of such materials possess sufficiently individual characteristics to such an extent that, as to utilization of any given starting material, determination of the optimum reaction conditions of $CCl_4$ quantity, temperature and space velocity are best ascertained by one or more test runs.

According to a modification of the invention, practice of the latter as above described may be carried out conjunctively with the use of metallic nickel. It has been found that the presence of metallic nickel in the reaction zone catalytically increases conversions considerably. Thus, in the practice of one desirable embodiment, the reactor may be packed with discrete metallic nickel, e. g. ¼″ x 30 gauge nickel helices, or metallic nickel in any other satisfactory form. If desired, metallic nickel alone, without the presence of $CCl_4$ may be used to catalyze the reaction.

The reactor employed may be of any suitable construction designed to facilitate maintenance in the reaction zone of the temperatures indicated. The reaction tube itself may be of any satisfactory material which does not adversely affect reaction. For example, a nickel reactor may be used, but in all instances it is also preferred to pack the reaction zone with metallic nickel should circumstances make desirable the use of the catalytic properties of metallic nickel itself or in conjunction with $CCl_4$. Other apparatus utilized, e. g. for continuously feeding and metering starting material and $CCl_4$ to the reactor, and for handling exit gases of the reactor to remove HCl or otherwise purify, dry, condense and fractionate to separate and recover desired products, may be as known in the art.

In the following examples, percent conversion was measured by water scrubbing the product gases to remove and recover HCl from the product gases, and determining by titration the HCl content of the wash water. Percent conversion was then calculated as mols HCl liberated per mol of starting material fed to the reactor. All runs were carried out in the absence of any extraneously introduced elemental chlorine. Unless otherwise indicated, parts noted are by weight.

*Example 1.*—In this operation, $CH_3CClF_2$ in vapor form was passed at a rate of about 60 parts per hour, through an unpacked, previously used nickel reactor tube maintained at temperature of about 550° C. Conversion of starting material to $CH_2=CF_2$ of about 14% was obtained. In a comparative run, about 50 parts of $CH_3CClF_2$ and about 2 parts per hour of $CCl_4$ were passed through the same reactor under the same temperature conditions, and conversion of $CH_3CClF_2$ to $CH_2=CF_2$ in the range of 50–60% was obtained.

*Example 2.*—About 55 parts per hour of $CH_3CClF_2$ were passed through an unpacked, new nickel reactor tube maintained at temperature of about 550° C. Conversion to $CH_2=CF_2$ of about 5% was obtained. About 55 parts of $CH_3CClF_2$ and about 10 parts per hour of $CCl_4$ were passed through the same reactor held at the same temperature, and conversion of starting material to $CH_2=CF_2$ of about 40% was obtained.

*Example 3.*—In this run, about 185 parts of $CH_3CClF_2$ and about 50 parts of $CCl_4$ were passed during a period of two hours through a previously used nickel reactor tube which was packed with ¼″ x 23 gauge nickel helices. Temperature was maintained at about 550° C. Reactor exit gases were scrubbed with water, passed over soda lime and $CaCl_2$, and totally condensed in a trap immersed in liquid nitrogen. The scrubbing water was tiltrated with standard NaOH for HCl and HF content. The wash water had an HF/HCl ratio of 0.025. On distillation of the trap contents, there were obtained 93 parts of $CH_2=CF_2$, B. P. minus 83° C.; 40 parts of $CH_3CClF_2$, B. P. minus 9.6° C.; 40 parts $CCl_4$, B. P. 77° C., and only one part of intermediate material boiling within the range of minus 83° up to minus 9.6° C. Conversion to $CH_2=CF_2$ amounted to about 80%.

*Example 4.*—In a run similar to that of Example 3, using the same nickel helices packed reactor of Example 3 and a temperature of about 550° C., 212 parts of $CH_3CClF_2$ and 36 parts of $CCl_4$ were passed through the reactor during a period of two hours. The wash water had an HF/HCl ratio of 0.029, and on distillation there were recovered 90 parts of $CH_2=CF_2$, B. P. minus 83° C.; 72 parts of $CH_3CClF_2$, B. P. minus 9.6° C.; 32 parts of $CCl_4$, B. P. 77° C., and only one part of intermediate material boiling within the range of minus 83° C. up to minus 9.6 C. Conversion to $CH_2=CF_2$ was about 69%. In both the foregoing runs no materials other than those indicated were found, thus indicating that little if any decomposition of $CCl_4$ was effected.

*Example 5.*—The nickel helices were removed from the reactor used in Examples 3 and 4, and a similar run was made using a total of 200 parts of $CH_3CClF_2$ and 30 parts of $CCl_4$ during a period of one hour. Conversion of starting material to $CH_2=CF_2$ of about 45% was obtained.

*Example 6.*—In this run, about 55 parts of $CH_3CClF_2$ and about 10 parts of $CCl_4$ per hour were passed through a previously unused nickel reactor tube packed with ¼" x 23 gauge nickel helices and maintained at temperature of about 550° C., the HCl scrubbing water had an HF/HCl ratio of about 0.025, and conversion to $CH_2=CF_2$ of about 63% was obtained. In other runs similar to the foregoing except that no $CCl_4$ was present, HF/HCl ratios were of the order of 0.05, thus indicating that the presence of $CCl_4$ appreciably reduces decomposition of the starting material.

*Example 7.*—In this run, the starting material was $CH_2ClCClF_2$, and a previously used nickel reactor tube was employed. 120 parts of a mixture containing about 104.4 parts of $CH_2ClCClF$ and 15.6 parts of $CCl_4$ were passed thru the reactor during a period of about 90 minutes, temperature being maintained at about 600° C. About 73 parts of product were recovered in a Dry-Ice trap, and about 24 parts in a water trap. The water from the water trap had an HF/HCl ratio of about 0.03. On distillation there were recovered 52 parts of $CHCl=CF_2$, B. P. minus 19° C.; 29 parts of $CH_2ClCClF_2$, B. P. plus 47° C.; and 13 parts of $CCl_4$, B. P. 77° C. Conversion of starting materials to $CHCl=CF_2$ of about 70% was obtained.

*Example 8.*—In a run similar to Example 7, carried out in the same reactor of Example 7 at temperature of about 600° C., about 92 parts of $CH_2ClCClF_2$ were passed through the reactor. No $CCl_4$ was present in the reactor during this run. The HCl wash water had an HF/HCl ratio of 0.04, and conversion of starting material to $CHCl=CF_2$ was about 42%.

*Example 9.*—About 55 parts per hour of $CH_3CClF_2$ were passed through a new nickel reactor tube, packed with ¼" x 30 gauge nickel helices, and maintained at temperature of about 550° C. No $CCl_4$ was present. Conversion to $CH_2=CF_2$ thus obtained was about 21%.

*Example 10.*—In this run, the starting material was $CH_2ClCClF_2$, and the reactor employed was the same as that utilized in Examples 7 and 8 except that the reactor was packed with ¼" x 30 gauge nickel helices. Temperature in the reactor was maintained at about 580° C., and 1187 parts of a mixture of about 1043 parts of starting material and about 144 parts of $CCl_4$ was passed thru the reactor over a period of four hours. The HF/HCl content of the wash water was 0.030. Conversion to $CHCl=CF_2$ was about 74%.

*Example 11.*—A series of three runs was carried out at temperatures in the range of 575–600° C., and with the same nickel packed reactor and gas mixture of Example 10. Average conversion, HF/HCl wash water ratio and space velocity were about 80%, 0.031 and 590 respectively.

I claim:

1. The process for making an olefinic compound which comprises dehydrochlorinating a chlorofluoroethane containing at least one hydrogen atom and at least one chlorine atom on adjacent carbon atoms by heating said ethane at temperature in the range of 500–610° C. while in the presence of $CCl_4$ in amount effective to promote dehydrochlorination and while in the absence of extraneously introduced elemental chlorine, and recovering an olefinic compound corresponding with said ethane.

2. The process for making an olefinic compound which comprises dehydrochlorinating a chlorofluoroethane containing at least one hydrogen atom and at least one chlorine atom on adjacent carbon atoms and at least one chlorine atom and one fluorine atom on a single carbon atom by heating said ethane at temperature in the range of 500–610° C. while in the presence of $CCl_4$ in amount effective to promote dehydrochlorination and while in the absence of extraneously introduced elemental chlorine, and recovering an olefinic compound corresponding with said ethane.

3. The process for making an olefinic compound which comprises dehydrochlorinating a chlorofluoroethane containing a $CClF_2$ group and at least one hydrogen atom on the adjacent carbon atom by heating said ethane at temperature in the range of 500–610° C. while in the presence of $CCl_4$ in amount effective to promote dehydrochlorination and while in the absence of extraneously introduced elemental chlorine, and recovering an olefinic compound corresponding with said ethane.

4. The process for making an olefinic compound which comprises dehydrochlorinating a chlorofluoroethane containing at least one hydrogen atom and at least one chlorine atom on adjacent carbon atoms by heating said ethane at temperature in the range of 500–610° C. while in the presence of $CCl_4$ in amount in the range of 2–25% by weight based on the weight of said ethane and while in the absence of extraneously introduced elemental chlorine, and recovering an olefinic compound corresponding with said ethane.

5. The process for making an olefinic compound which comprises dehydrochlorinating a chlorofluoroethane containing a $CClF_2$ group and at least one hydrogen atom on the adjacent carbon atom by heating said ethane at temperature in the range of 500–610° C. while in the presence of $CCl_4$ in amount in the range of 2–25% by weight based on the weight of said ethane and while in the absence of extraneously introduced elemental chlorine, and recovering an olefinic compound containing a $CF_2$ group.

6. The process for making $CH_2=CF_2$ which comprises dehydrochlorinating $CH_3CClF_2$ by heating the same at temperature in the range of 500–610° C. while in the presence of $CCl_4$ in amount in the range of 2–25% by weight based on the weight of said $CH_3CClF_2$ and while in the absence of extraneously introduced elemental chlorine, and recovering $CH_2=CF_2$ from the resultant reaction products.

7. The process for making an olefinic compound which comprises dehydrochlorinating a chlorofluoroethane containing at least one hydrogen atom and at least one chlorine atom on adjacent carbon atoms by heating said ethane at temperature in the range of 500–610° C. while in the presence of $CCl_4$ and metallic nickel both in amount effective to promote dehydrochlorination and while in the absence of extraneously introduced elemental chlorine, and recovering an olefinic compound corresponding with said ethane.

8. The process for making an olefinic compound which comprises dehydrochlorinating a chlorofluoroethane containing a $CClF_2$ group and at least one hydrogen atom on adjacent carbon atoms by heating said ethane at temperature in the range of 500–610° C. while in the presence of $CCl_4$ and metallic nickel both in amount effective to promote dehydrochlorination and while in the absence of extraneously introduced elemental chlorine, and recovering an olefinic compound corresponding with said ethane.

9. The process for making an olefinic compound which comprises dehydrochlorinating a chlorofluoroethane containing at least one hydrogen atom and at least one chlorine atom on adjacent carbon atoms by heating said ethane at temperature in the range of 500–610° C. while in the presence of metallic nickel in amount effective to promote dehydrochlorination and in the presence of $CCl_4$ in amount in the range of 2–25% by weight based on the weight of said ethane, and while in the absence of extraneously introduced elemental chlorine, and recovering an olefinic compound corresponding with said ethane.

10. The process for making an olefinic compound which comprises introducing a chlorofluoroethane, containing at least one hydrogen atom and at least one chlorine atom on adjacent carbon atoms, into a reaction zone substantially packed with discrete bodies of metallic nickel, dehydrochlorinating said ethane by passing the same through said zone, maintained at temperature in the range of 500–610° C., while in admixture with $CCl_4$ in amount effective to promote dehydrochlorination and while in the absence of extraneously introduced elemental chlorine, discharging reaction products from said zone, and recovering from said products an olefinic compound corresponding with said ethane.

11. The process for making an olefinic compound which comprises introducing a chlorofluoroethane, containing a $CClF_2$ group and at least one hydrogen atom on the adjacent carbon atom, into a reaction zone substantially packed with discrete bodies of metallic nickel, dehydrochlorinating said ethane by passing the same through said zone, maintained at temperature in the range of 500–610° C., while in admixture with $CCl_4$ in amount effective to promote dehydrochlorination and while in the absence of extraneously introduced elemental chlorine, discharging reaction products from said zone, and recovering from said products an olefinic compound containing a $CF_2$ group.

12. The process for making an olefinic compound which comprises introducing a chlorofluoroethane, containing at least one hydrogen atom and at least one chlorine atom on adjacent carbon atoms, into a reaction zone substantially packed with discrete bodies of metallic nickel, dehydrochlorinating said ethane by passing the same through said zone, maintained at temperature in the range of 500–610° C., while in admixture with $CCl_4$ in amount in the range of 2–25% by weight based on the weight of said ethane and while in the absence of extraneously introduced elemental chlorine, discharging reaction products from said zone, and recovering from said products an olefinic compound corresponding with said ethane.

13. The process for making an olefinic compound which comprises introducing a chlorofluoroethane, containing a $CClF_2$ group and at least one hydrogen atom on the adjacent carbon atom, into a reaction zone substantially packed with discrete bodies of metallic nickel, dehydrochlorinating said ethane by passing the same through said zone, maintained at temperature in the range of 500–610° C., while in admixture with $CCl_4$ in amount in the range of 2–25% by weight based on the weight of said ethane and while in the absence of extraneously introduced elemental chlorine, discharging reaction products from said zone, and recovering from said products an olefinic compound containing a $CF_2$ group.

CHARLES B. MILLER.

REFERENCES CITED

The following references are of record in the file of this patent:

UNITED STATES PATENTS

| Number | Name | Date |
|---|---|---|
| 2,461,523 | Coffman et al. | Feb. 15, 1949 |
| 2,478,933 | Bratton | Aug. 16, 1949 |
| 2,551,573 | Downing et al. | May 8, 1951 |
| 2,566,807 | Padburg et al. | Sept. 4, 1951 |